3,397,272
CYCLOALKYL BENZYLAMINE AND ANOREXIGENIC COMPOSITIONS AND METHOD OF USE
Karl J. Doebel, Ossining, and Frederick Leonard, Yonkers, N.Y., assignors to Geigy Chemical Corporation, Greenburgh, N.Y., a corporation of Delaware
No Drawing. Original application Oct. 24, 1963, Ser. No. 318,761, now Patent No. 3,320,252, dated May 16, 1967. Divided and this application Sept. 16, 1966, Ser. No. 615,273
10 Claims. (Cl. 424—248)

This application is a division of our application Ser. No. 318,761, filed Oct. 24, 1963, now Patent No. 3,320,252 which in turn was a continuation-in-part of application Ser. No. 290,927, filed June 27, 1963, now abandoned, solely by Karl J. Doebel.

This invention relates to certain novel cycloalkyl benzylamines which possess valuable pharmacological properties and are useful as pharmaceutical agents as well as to novel phrmaceutical compositions therewith and a method of using the same.

More particularly, in one aspect, the present invention resides in cycloalkyl benzylamines which may be represented by the following formula:

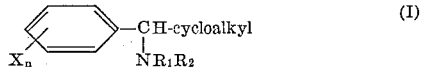

wherein $NR_1R_2$ represents mono(lower)alkylamino, or a N-heterocyclic moiety such as morpholino, N-methylpiperazino, piperidino, pyrrolidino, hexamethyleneimino, etc.; X stands for hydrogen, halogen—preferably chlorine or bromine—trifluoromethyl, lower alkyl, lower alkoxy, etc.; and $n$ is an integer of 1 to 3.

The "cycloalkyl" moiety in the above formula is preferably cyclopentyl or cyclohexyl and the term "lower alkyl" as used herein per se and as included in the term "lower alkoxy" means saturated monovalent straight-chain or branched-chain aliphatic radicals of the general formula $—C_mH_{2m+1}$ wherein $m$ designates an integer of less than five.

N-heterocyclic substituted cycloalkyl benzylamines included in the above Formula I can be synthesized in analogy to the Stewart and Hauser synthesis (JACS 77, 1098; 1955) as follows: A benzaldehyde, a heterocyclic amine and butanol-1 are reacted in the presence of mercuric chloride (1) to give an α-butyloxybenzyl compound which, upon reaction (2) with a Grignard reagent of a cycloalkyl halide, yields the desired final compounds.

The mode of formation of these compounds may be illustrated by the following equations:

(1)

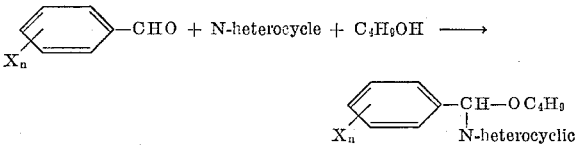

(2)

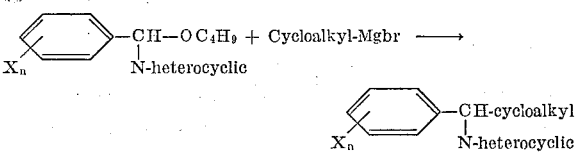

wherein the symbols X and $n$ have the aforesaid meaning; and N-heterocycle or N-heterocyclic denotes morpholine N-methylpiperazine, piperidine, pyrrolidine, hexamethyl eneimine, etc., or morpholino, N-methylpiperazino, piper idino, pyrrolidino, hexamethyleneimino, etc.

The N-mono(lower)alkyl cycloalkyl benzylamines within the above Formula I can be synthesized by reacting a phenyl cycloalkyl ketone with a mono(lower) alkylformamide in the presence of formic acid in accordance with the following illustrative equation:

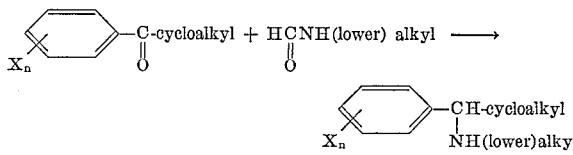

wherein the symbols used have the meanings given to them above.

The starting materials for compounds of this invention are either commercially available or can be readily synthesized in accordance with prior art methods as illustrated below.

The present invention comprehends not only the above described compounds in their free base form, but it also includes pharmaceutically acceptable nontoxic acid addition salts which may be formed from said compounds in accordance with conventional practice, by using appropriate inorganic and organic acids, such as hydrohalic acids, especially hydrochloric and hydrobromic acids, sulfuric, ethanesulfonic and phosphoric acids as well as acetic, aminoacetic, lactic, succinic, malic, aconitic phthalic and tartaric acids.

These new compounds and the methods for their preparation may be exemplified more fully by the following illustrative examples; the scope of the invention is, however, not limited thereto. The temperatures therein are given in degrees centigrade.

Example 1.—N-(α-cyclopentyl-m-chlorobenzyl) morpholine (1) m-Chlorobenzaldehyde (14.04 g.), 9.0 g. of morpholine and 37 g. (46 ml.) of n-butanol were mixed with 700 mg. of mercuric chloride and 50 g. of drierite (anhydrous calcium sulfate) and stirred at room temperature for 48 hours. A few milligrams of solid phenolphthalein was then added and enough sodium bicarbonate introduced to make the mixture strongly alkaline. The mixture was then filtered through a Buchner funnel and the filtrate directly fractionated in vacuo. 22.4 g. of N-(α-butyloxy - α - m - chlorobenzyl)morpholine, B.P. 126–127°/0.45 mm.; $n_D^{23}=1.5175$, was obtained.

(2) A Grignard reagent was then prepared from 3.75 g. of magnesium, 200 ml. of ether and 17.4 g. of cyclopentyl bromide. A solution of 22.0 g. of the N-(α-butyloxy-α-m-chlorobenzyl)morpholine in 30 ml. of dry ether was then slowly dropped in. The reaction mixture was then stirred for 12 hours at room temperature and then poured into a solution of ammonium chloride in ice water and the Grignard complex decomposed. The mixture was made alkaline with 20% NaOH, extracted with ether, washed with water, dried over anhydrous sodium sulfate and the solvents removed in vacuo. The residue was fractionated twice in high vacuum and the fraction boiling at 147–148°/0.45 mm. collected. Yield: 13.52 g.; $n_D^{24}=1.5484$.

Analysis.—Calc'd for $C_{16}H_{22}ClNO$: C, 68.8; H, 7.93;

Cl, 12.71; N, 5.02. Found: C, 68.74; H, 7.97; Cl, 12.57; N, 4.80.

If in the above example, piperidine or pyrrolidine or hexamethyleneimine is used in the first step in lieu of morpholine, the corresponding piperidino, pyrrolidino or hexamethyleneimino compounds are produced and if in place of cyclopentyl bromide, in the second step, cyclohexyl bromide is employed, the corresponding cyclohexyl benzylamine is obtained.

Example 2.—N-(α-cyclopentyl-m-chlorobenzyl)-N'-methylpiperazine (1) m-Chlorobenzaldehyde (14.0 g.), 10.0 g. of N-methylpiperazine and 37 g. (46 ml.) of n-butanol were mixed with 700 mg. of mercuric chloride and 50 g. of drierite and stirred at room-temperature for 48 hours. A few milligrams of solid phenolphthalein was added and then enough sodium bicarbonate to make the mixture strongly alkaline. The contents were filtered with suction and the filtrate was freed from butanol in vacuum. The residue was distilled in high-vacuum to give 24.46 g. of N-(α-butyloxy-m-chlorobenzyl)-N'-methylpiperazine; B.P. 124–127°/0.3 mm. Redistillation afforded 23.65 g. of pure material; B.P. 126–128°/0.4 mm.; $n_D^{24}$=1.5165.

(2) A Grignard reagent was then prepared from 3.84 g. of magnesium and 17.9 g. of cyclopentyl bromide in 200 ml. of dry ether. After completion, the mixture was stirred for 1½ hours and then a solution of 23.65 g. of the N-(α-butyloxy-m-chlorobenzyl)-N'-methylpiperazine in 35 ml. of dry ether was slowly dropped in. The reaction was stirred for 12 hours at room temperature and was then poured into 500 ml. of ice cold saturated ammonium chloride solution. After alkalinization and extraction with ether, a residue was obtained, which upon careful fractionation in high-vacuum afforded 16.62 g. of and oil; B.P. 135–136°/0.3 mm.; $n_D^{24}$=1.5462. This oily material was converted into the dihydrochloride; M.P. 275–277° (dec.).

Analysis.—Calc'd for $C_{17}H_{27}Cl_3N_2$: C, 55.9; H, 7.46; N, 7.68; Cl, 29.15. Found: C, 55.73; H, 7.63; N, 7.95; Cl, 29.06.

Example 3.—N-methyl-α-cyclopentyl-m-chlorobenzylamine (a) Preparation of the intermediate ketone.—Cyclopentyl magnesium bromide was prepared by reacting 38 g. of cyclopentyl bromide with 6 g. of magnesium in 150 ml. of dry ether. A solution of 18 g. of m-chlorobenzonitrile in 100 ml. of dry ether was added dropwise at 10°. Benzene was added and the ether removed by distillation. The benzene solution was refluxed for 2 hours. About 100 g. of cracked ice was added, followed by 200 ml. of 6 N hydrochloric acid. The reaction mixture was then refluxed for a further 2 hours to hydrolyze the ketimine hydrochloride. After cooling, the benzene layer was separated and the aqueous layer extracted once with ether. The two extracts were combined, dried and the solvents removed in vacuo to give 23.5 g. of oil. This was reacted in ethanolic solution with 18.9 g. of Girard-T-reagent. Separation according to standard procedure gave 8.774 g. of m-chlorophenylcyclopentyl-ketone which was distilled; B.P. 90–92°/0.3 mm.; $n_D^{25}$=1.5541.

(b) Preparation of desired compound.—A mixture of 7.2 g. of m-chlorophenyl-cyclopentyl-ketone and 68 ml. of N-methylformamide and 23 ml. of formic acid was refluxed for 16 hours. Excess reagents were then removed in vacuo and the residue was refluxed again with 115 ml. of concentrated hydrochloric acid for two hours. After cooling, the mixture was poured into 700 ml. of water, extracted with ether and the separated aqueous phase made alkaline with 10 N sodium hydroxide and extracted with ether. The ethereal extracts are washed with water and dried over anhydrous sodium sulfite and the solvent was removed in vacuo. The residue was carefully fractioned in vacuo to give 5.2 g. of N-methyl-α-cyclopentyl-m-chlorobenzylamine; B.P. 91–92°/0.3 mm.; $n_D^{24}$=1.5393.

Analysis.—Calc'd for $C_{13}H_{18}ClN$: C, 69.99; H, 8.13; Cl, 15.88; N, 6.28. Found: C, 69.94; H, 8.00; Cl, 15.65; N, 6.21.

In another aspect, the instant invention pertains to pharmaceutical compositions containing cycloalkyl benzylamines of the above Formula I and to a method for obtaining an anorexic effect in mammals by administering internally to them such cycloalkyl benzylamines.

Anorexigenic compositions are sometimes referred to as anorexic or anorectic compositions, appetite-satient or appetite-depressant or suppressant compositions, anti-appetite or anti-obesity compositions, or weight or appetite-control compositions and the like and are known in the art. However, the known anorexigenic compositions and processes possess undesirable side effects especially those resulting from a high degree of central nervous system stimulation which often cause jitteriness, nervous tension, disturbances of sleep, and undesirable effects on blood pressure and cardiac rhythm.

Briefly, the anorexigenic compositions and the process for achieving anorexigenic effects employ as an active ingredient a cycloalkylbenzylamine derivative, as defined in Formula I, and pharmaceutically acceptable acid addition and quaternary ammonium salts thereof dispersed in an oral or parenteral pharmaceutical carrier.

The inventive compositions have unexpectedly been found to possess lessened undesirable side effects such as those occurring in the known anorexigenic compositions.

Particularly preferred as anorexic agents among the compounds circumscribed by the above formula is N-(α-cyclopentyl - m - chlorobenzyl) - N' - methylpiperazine (compound A hereinafter). Good anorexic activity is also exhibited by N - (α - cyclopentyl - m - chlorobenzyl) morpholine (compound B hereinafter) and N-methyl-α-cyclopentyl-m-chlorobenzylamine (compound C hereinafter) and the inventive compositions and process will be illustrated by reference to these preferred embodiments.

Toxicity studies have shown that the compounds useful in practicing this invention are relatively non-toxic and therefore compatible with their intended use as anorexigenic agents. To illustrate, the acute toxicity data for these compounds are as follows in Table I:

TABLE I.—ACUTE $LD_{50}$ IN THE MOUSE IN Mg./Kg.

| Compound: | p.o. | i.p. | i.v. |
| --- | --- | --- | --- |
| A | 312 | 98.8 | 48 |
| B | >3,000 | >2,000 | >100>200 |
| C | 250 | 162 | 49 |

In subchronic toxicity studies the effect on blood and body weight was determined. 24 animals [Rat CD (Charles River)] averaging 74–82 g. were given 50 mg./kg. of compound A p.o. five times a week s.i.d. for 62 days. In order to avoid a prolonged anorectic state in the animals the compound was fed early in the morning by stomach tube. In spite of the relatively high dose there were no toxic manifestations in any of the treated animals: their blood and their body weight was normal when compared with the control animals.

In a series of anorexigenic tests groups of from 3–6 male rats, one group being the control group, were utilized. All animals were conditioned over a period of time (3 to 14 days) to consume their food within seven hours each day. In a three to five day test period, the average food consumption for two to three consecutive days (pre-treatment) was recorded. For two days (treatment) immediately following the pre-treatment the animals were given the hydrochloride of compounds A, B and C in solution p.o. or s.c. once daily, with food consumption for all groups being recorded seven hours after administration of the test compounds. Cumulative data after p.o. treatment are summarized in Table II:

TABLE II

| Test Compound | Dose, Mg./kg. | No. Animals | Food Eaten in gms. Daily | | Percent, Increase/ Decrease |
|---|---|---|---|---|---|
| | | | Pre-Treatment | Treatment | |
| Control | | 24 | 18.5 | 19.4 | +4.85 |
| A | 6.25 | 3 | 14.7 | 12.4 | −16.5 |
| | 12.50 | 5 | 15.4 | 9.5 | −38.6 |
| | 25.00 | 17 | 24.7 | 18.0 | −27.0 |
| | 50.00 | 23 | 23.0 | 15.2 | −34.1 |
| B | 50.00 | 5 | 19.3 | 17.3 | −10.4 |
| | 100.00 | 9 | 19.2 | 15.8 | −17.6 |
| C | 50.00 | 15 | 18.0 | 13.8 | −23.1 |

The test results after s.c. treatment are summarized in Table III:

TABLE III

| Test Compound | Dose, Mg./kg. | No. Animals | Food Eaten in gms. Daily | | Percent, Increase/ Decrease |
|---|---|---|---|---|---|
| | | | Pre-Treatment | Treatment | |
| A | 12.50 | 5 | 22.1 | 15.9 | −28.1 |
| | 25.00 | 4 | 23.2 | 12.8 | −44.8 |
| B | 25.00 | 5 | 17.4 | 14.6 | −16.0 |
| | 50.00 | 5 | 17.9 | 16.1 | −10.0 |
| | 5.00 | 5 | 18.3 | 18.5 | +1.1 |
| | 10.00 | 5 | 10.5 | 8.3 | −20.5 |

In a variation of the above test series, animals conditioned to consume at will beef extract broth containing 0.75% beef extract (BACTO) as well as solid food and for test purposes, only animals with uniform intake were chosen. Water was also available to the animals. The results after p.o. treatment are summarized in Table IV:

TABLE IV

| Test Compound | Dose, Mg./Kg. | No. Animals | Beef Broth Intake in ml. | | Percent, Increase/ Decrease |
|---|---|---|---|---|---|
| | | | Pre-Treatment | Treatment | |
| Control | | 6 | 20.7 | 23.3 | +12.6 |
| A | 50.00 | 6 | 33.4 | 18.9 | −43.4 |
| B | 100.00 | 4 | 25.7 | 8.6 | −66.5 |
| C | 50.00 | 4 | 33.1 | .8 | −67.4 |

| Test Compound | Dose, Mg./Kg. | No. Animals | Food Intake in mg. | | Percent, Increase/ Decrease |
|---|---|---|---|---|---|
| | | | Pre-Treatment | Treatment | |
| Control | | 6 | 19.9 | 21.0 | +5.5 |
| A | 50.00 | 6 | 21.1 | 13.8 | −34.8 |
| B | 100.00 | 4 | 20.1 | 15.2 | −24.3 |
| C | 50.00 | 4 | 19.9 | 16.5 | −17.3 |

In still another anorexigenic study with a group of eight rats over a five-day period, it was found that on an average, the dihydrochloride of compound A reduced food consumption by 44% and caused a weight loss of 19% at a dose of 25 mg./kg. p.o.; compound B reduced food consumption by 28% and caused a weight loss of 24% at a dose of 50 mg./kg. p.o.; and compound C reduced food consumption by 16% and caused a weight loss of 31% at a dose of 50 mg./kg. p.o.

As stated above, the compounds of this invention do not possess the undesirable side effects due to a high degree of CNS stimulation which is characteristic of anorexic agents of the prior art. For instance, when tested for CNS stimulant properties as indicated by locomotor activity in a Woodard activity cage with groups of three to five mice or by gross observational manifestions in rats, compound A elicited no CNS stimulation while compounds B and C elicited only slight CNS stimulation.

These compounds exhibit also anti-serotonin and cholinolytic activity in vitro and may, therefore, be useful as anti-rheumatic, anti-inflammatory, hypotensive/anti-hypertensive, anti-depressant as well as spasmolytic agents.

According to this invention new compositions in dosage unit form for obtaining an anorexigenic effect in mammals comprise a quantity of about 25 to 300 mg. of a cycloalkylbenzylamine derivative as defined above as active anorexic ingredient and pharmaceutical excipients or carriers known for the production of formulations suitable for oral or parenteral administration.

Compositions suitable for oral administration are the known pharmaceutical forms for such administration, as for example, tablets, capsules, pills, syrups, elixirs and aqueous or oily suspensions and the excipients used in the production of these formulations are the excipients well known to the pharmacist's art, as are also the means of formulation.

Particularly suitable compositions may be tablets wherein the cycloalkylbenzylamine is mixed with an inert diluent, as for example, calcium sulfate or carbonate, lactose, etc. Disintegrating agents, such as starch and lubricating agents, such as magnesium stearate, are also advantageously added.

In preparing a tablet, it is first necessary to make up a base granulation containing the active ingredient in the form of a uniformly fine powder and powdered sucrose, powdered lactose, powdered starch, powdered calcium sulfate or carbonate or combinations of such substances. If desired, a color may be incorporated at the same time by dissolving it in a portion of the granulating solution or as a dry impalpable powder before moistening with gelatin, acacia, etc.

The uniformly dampened material is then screened coarsely (No. 4 to 12 mesh, depending on the properties of the dampened mass), spread on trays in thin layers, and dried. When dry, the mass is further sieved through a No. 16 or No. 20 mesh screen.

A lubricating agent, such as calcium or magnesium stearate, and a disintegrating agent as, for example, dried powdered starch are then mixed. After the mixture has been completed it is then added to the base granulation, as previously described, and the mixed material is then compressed in tablet form.

A typical formulation for tablets is as follows:

Example 4

| | Mg. |
|---|---|
| Compound of Example 2 HCl | 25 |
| Lactose | 68 |
| Talc | 75 |
| Starch | 87 |
| Colored starch | 26 |
| Gelatin | 3 |
| Stearic acid | 3 |

It is contemplated that the anorexic agents of this invention may also be used in the form of coated or compressed and coated tablets in addition to compressed tablets.

Aqueous suspensions for oral use may contain cyclopentylbenzylamine in aqueous media in the presence of a suitable non-toxic suspending agent, such as sodium carboxymethylcellulose and suitable dispersing agents. Suitable dispersing agents may be, for example, lecithin or condensation products of ethylene oxide with fatty acids, as for example, polyoxyethylene stearate or with fatty alcohols, as for example, heptadeca-ethyleneoxycetanol or with partial esters derived from the fatty acids and hexitols, for example, polyoxyethylene sorbitol hexaoleate, or with partial esters derived from the fatty acids and hexitol anhydrides, for example, hexitans derived from sorbitol, such as polyoxyethylene sorbitan monooleate. Oily suspensions or emulsions for oral use may be formulated in a suitable vegetable oil, for example, arachis oil which may contain suitable sweetening agents and preservatives.

Compositions suitable for parenteral administration are the known pharmaceutical forms for such administration, for example, sterile dispersion in aqueous and oily media. The excipients used in these formulations are the excipients well known to the pharmacist's art, as are also the means of formulation.

The sterile aqueous dispersion for parenteral administration may be formulated in the presence of parenterally-acceptable suspending agents and dispersing agents. Suitable suspending agents may be, for example, sodium carboxymethylcellulose, sodium alginate or polyvinyl pyrrolidone and suitable dispersing agents may be lecithin or the ethylene oxide condensation products described above for use as dispersing agents in the preparation of oral aqueous suspensions. Suitable injectable oily preparations may be prepared by dispersing cyclopentylbenzylamine in an oily medium, for example, a vegetable oil, such as arachis oil which is known to be non-toxic and parenterally-acceptable.

A typical formulation for a parenteral composition is as follows:

Example 5

| | | |
|---|---|---|
| Compound of Example 2 HCl | mg | 25.00 |
| Sodium citrate | mg | 3.60 |
| Citric acid | mg | 0.75 |
| Water (demineralized, deionized) | cc | 1.00 |

What is claimed is:

1. A process for obtaining an anorexigenic effect in mammals which comprises administering internally a dosage unit form of a member selected from the group consisting of a compound of the formula

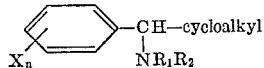

wherein $NR_1R_2$ is selected from the group consisting of mono(lower)alkylamino, morpholino, N-methylpiperazino, piperidino, pyrrolidino and hexamethyleneimino;

X is chosen from the group consisting of hydrogen, chlorine, bromine, trifluoromethyl, lower alkyl and lower alkoxy;

$n$ is an integer of 1 to 3;

cycloalkyl is selected from the group consisting of cyclopentyl and cyclohexyl or non-toxic water-soluble acid addition salts thereof, in an amount ranging from about 25 to 300 milligrams of said compound.

2. A process for obtaining an anorexigenic effect in mammals which comprises administering internally a dosage unit form of a compound of the group consisting of N-($\alpha$-cyclopentyl-m-chlorobenzyl)-N'-methylpiperazine and non-toxic water-soluble acid addition salts thereof, in an amount ranging from about 25 to 300 milligrams of said compound.

3. A process for obtaining an anorexigenic effect in mammals which comprises administering internally a dosage unit form of a compound of the group consisting of N-($\alpha$-cyclopentyl-m-chlorobenzyl)morpholine and non-toxic water-soluble acid addition salts thereof, in an amount ranging from about 25 to 300 milligrams of said compound.

4. A process for obtaining an anorexigenic effect in mammals which comprises administering internally a dosage unit form of a compound of the group consisting of N-methyl-$\alpha$-cyclopentyl-m-chlorobenzylamine.

5. A pharmaceutical composition in dosage unit form comprising a quantity of about from 25 to 300 milligrams of a member of the group consisting of a compound of the formula

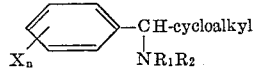

wherein $NR_1R_2$ is selected from the group consisting of mono(lower)alkylamino, morpholino, N-methylpiperazino, piperidino, pyrrolidino and hexamethyleneimino;

X is chosen from the group consisting of hydrogen, chlorine, bromine, trifluoromethyl, lower alkyl and lower alkoxy;

$n$ is an integer of 1 to 3;

cycloalkyl is selected from the group consisting of cyclopentyl and cyclohexyl or non-toxic water-soluble acid addition salts thereof, and a pharmaceutical carrier.

6. A pharmaceutical composition in dosage unit form comprising a quantity of about from 25 to 300 milligrams of a member of the group consisting of N-($\alpha$-cyclopentyl-m-chlorobenzyl)-N'-methylpiperazine and non-toxic water-soluble acid addition salts thereof, and a pharmaceutical carrier.

7. A pharmaceutical composition in dosage unit form comprising a quantity of about from 25 to 300 milligrams of a member of the group consisting of N-($\alpha$-cyclopentyl-m-chlorobenzyl)morpholine and non-toxic water-soluble acid addition salts thereof, and a pharmaceutical carrier.

8. A pharmaceutical composition in dosage unit form comprising a quantity of about from 25 to 300 milligrams of a member of the group consisting of N-methyl-$\alpha$-cyclopentyl-m-chlorobenzylamine and non-toxic water-soluble acid addition salts thereof, and a pharmaceutical carrier.

9. A pharmaceutical composition according to claim 5 wherein the pharmaceutical carrier is for oral administration.

10. A pharmaceutical composition according to claim 5 wherein the pharmaceutical carrier is for parenteral administration.

References Cited

UNITED STATES PATENTS 3,222,399  12/1965  Faust et al. _____ 260—570.5

ALBERT T. MEYERS, *Primary Examiner.*

S. ROSEN, *Assistant Examiner.*